United States Patent [19]

King et al.

[11] Patent Number: 4,726,112

[45] Date of Patent: Feb. 23, 1988

[54] METHOD OF ASSEMBLING A DYNAMOELECTRIC MACHINE

[75] Inventors: James L. King; Kerry B. Shelton, both of Holland, Mich.

[73] Assignee: General Electric Company, Fort Wayne, Ind.

[21] Appl. No.: 923,997

[22] Filed: Oct. 28, 1986

Related U.S. Application Data

[62] Division of Ser. No. 681,685, Dec. 14, 1984, Pat. No. 4,626,726.

[51] Int. Cl.[4] .................... H02K 15/14; H02K 5/167; F16C 77/06
[52] U.S. Cl. ........................................ 29/596; 310/90; 310/91; 248/581; 384/215
[58] Field of Search .................. 29/596; 248/581, 604, 248/609, 635; 310/42, 89, 90, 91; 384/202, 203, 205, 206, 209, 215, 536, 582

[56] References Cited

U.S. PATENT DOCUMENTS

| Re. 31,525 | 2/1984 | Boyd, Jr. et al. | 248/581 |
| 2,092,291 | 9/1937 | Olsen | 384/582 |
| 2,462,172 | 2/1949 | Esarey | 310/90 |
| 2,840,329 | 6/1958 | Wightman | 248/26 |
| 2,904,289 | 9/1959 | Refice | 248/26 |
| 3,164,422 | 1/1965 | Shaffer et al. | 308/132 |
| 3,235,207 | 2/1966 | Church | 248/26 |
| 3,483,409 | 12/1969 | Phillips | 310/51 |
| 3,704,922 | 12/1972 | Kleinschmidt et al. | 384/582 |
| 3,750,267 | 8/1973 | Otto | 29/507 |
| 3,897,023 | 7/1959 | Burkhalter et al. | 384/202 |
| 3,961,829 | 6/1976 | Bowen et al. | 384/536 |
| 4,362,342 | 12/1982 | Bushor et al. | 310/90 |

Primary Examiner—Timothy V. Eley
Attorney, Agent, or Firm—Ralph E. Krisher, Jr.

[57] ABSTRACT

A method of assembling a dynamoelectric machine. The dynamoelectric machine includes at least one end frame having a hub portion extending therefrom, and a cushioning device. The cushioning device has a pair of generally annular cylindric mounts associated generally concentrically with one of the mounts having an axial length greater than that of the other of the mounts, and a resilient material is interconnected between the mounts. In practicing this method, a part of the one mount is mounted in engagement about the hub, and thereby the other mount is disposed in a preselected position axially beyond the hub portion of the at least one end frame.

9 Claims, 5 Drawing Figures

METHOD OF ASSEMBLING A DYNAMOELECTRIC MACHINE

This is a divisional, of application Ser. No. 681,685, filed Dec. 14, 1984 now U.S. Pat. No. 4,626,726.

FIELD OF THE INVENTION

This invention relates in general to electrical apparatus and in particular to a cushioning device, dynamoelectric machine.

BACKGROUND OF THE INVENTION

In the past, the isolation of vibrations established by an energized electric motor from a supporting structure therefor has been accomplished in various different manners, see for instance U.S. Pat. Nos. 2,840,329 (Wightman), 2,904,289 (Refice), 3,235,207 (Church) and 3,750,267 (Otto), all of which are assigned to the assignee of the present application.

At least some of the prior art motors had hubs integrally formed and axially extending from opposite end frames of such a motor with fixed type bearings, such as a sleeve bearing or the like for instance, disposed within such hubs, and resilient motor mounts were secured by suitable means about such hubs and received in a cradle or the like for supporting the motor thereby to resiliently isolate the cradle from vibrations of the motor upon energization thereof. Although these past resilient motor mounts undoubtedly exhibited many salient features, it is believed that at least one disadvantageous or undesirable feature of such resilient motor mounts when secured by bonding or the like directly onto the end frame hub was that an additional retaining ring or the like was necessarily secured to such hub to prevent the displacement of such resilient motor mounts therefrom.

In others of the prior art motors, sleeve members (in the form of the above discussed hub) were secured to the opposite end frames so as to extend generally axially therefrom, and such sleeve members were splined for anti-rotational engagement with complementary splines provided in the resilient motor mounts which were received in a cradle supporting the motor in the manner discussed above. While this type of construction undoubtedly provided many salient features, at least one of the disadvantageous or undesirable features thereof is believed to be the added cost involved with respect to the provisions of such splined sleeve and the complexity of assembling it with the motor. In this vein, the aforementioned Otto patent utilized an annulus press fitted into the desired position thereof about a sleeve member connected to a motor end frame so as to extend axially therefrom, and flanges on the annulus were deformed into gripping or anti-rotational engagement with an associated resilient motor mount in response to the press-fitting of the annulus about the sleeve member. Undoubtedly, this type of past construction also exhibited many salient features, but one of the disadvantageous or undesirable features thereof is also believed to involve the added cost with respect to the provision of such annulus and the complexity of assembling it with the motor.

While the above discussed prior art constructions undoubtedly exhibited many salient features, as previously mentioned it is believed that such prior art constructions failed to address a disadvantageous or undesirable feature involving swivel torque of resilient motor mounts or cushioning devices when they are secured about integral hub portion of opposite end frames on a motor and also received in the cradle for supporting the motor.

SUMMARY OF THE INVENTION

Among the several objects of the present invention may be noted the provision of an improved method of assembling a dynamoelectric machine which overcomes the above discussed disadvantageous or undesirable features, as well as others, of the prior art constructions; the provision of such improved method in which swivel torque transmitted by a cushioning device between a dynamoelectric machine and a supporting means therefor is at least predeterminately limited; the provision of such improved method in which a mounting axis of such cushioning device received on the dynamoelectric machine supporting means extends in an imaginary plane generally parallel to and spaced at least closely adjacent another imaginary plane extending through the midsection of the bearing engagement between at least a partial spherical bearing surface on an end frame of the dynamoelectric machine and a means for journaling a rotatable assembly of the dynamoelectric machine thereby to at least limit such swivel torque; the provision of such improved method in which the cushioning device is secured onto an end frame of the dynamoelectric machine so as to define therein a chamber for containing a lubricant storage wicking material; the provision of such improved method in which the cushioning device has a pair of generally annular cylindric mounts generally concentrically arranged with a resilient material bonded therebetween and with one mount disposed at least adjacent one opposite end portion of the other mount and spaced axially from another opposite end thereof; the provision of such improved method in which the axial length of the inner annular cylindric mount is predeterminately greater than that of the outer annular cylindric mount so as to provide a greater bonding interface between the inner annular cylindric mount and the resilient material bonded thereto so as to enhance resistance with respect to separation of the resilient material from the inner annular cylindric mount; and the provision of such improved method in which the components utilized therein are simple in design, economically manufactured and easily assembled. These as well as other objects and advantageous features of the present invention will be in part apparent and in part pointed out hereinafter.

In general and in one form of the invention, a method is provided for assembling a dynamoelectric machine. The dynamoelectric machine includes at least one end frame with a hub portion extending generally axially therefrom. The cushioning device includes a pair of generally annular cylindric mounts arranged generally concentrically with each other with one of the mounts having an axial length predeterminately greater than the other of the mounts, and a resilient material disposed at least in part between the mounts. The method comprises associating a part of the one mount of the cushioning device in mounting engagement about the hub portion of the at least one end frame generally along the axial extent of the hub portion and extending thereby the cushioning device generally axially from the at least one end frame and positioning the other mount generally in a preselected location axially beyond the hub portion of the at least one end frame in response to the associating and extending step.

BRIEF DESCRIPTION OF THE INVENTION

Corresponding reference numerals refer to corresponding parts throughout the several views of the drawings.

The exemplifications set out herein illustrate the preferred form of the invention in one form thereof, and such exemplifications are not to be construed as limiting in any manner the scope of either such invention or the disclosure thereof.

DETAILED DESCRIPTION OF THE PREFERRED EMBODIMENT

Figure 1:
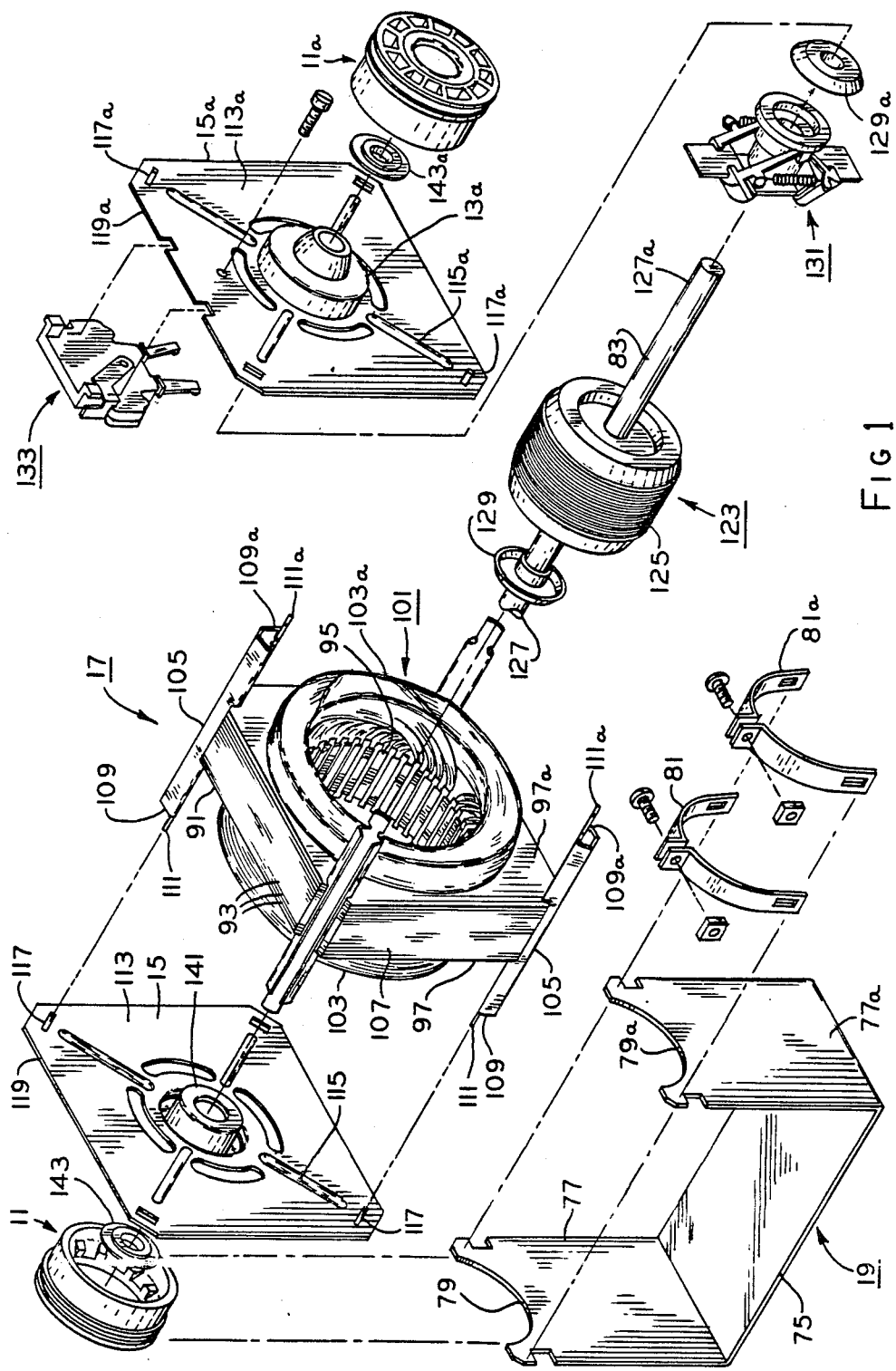
FIG. 1 is an exploded perspcetive view showing a dynamoelectric machine and illustrating principles which may be practiced in a method of assembling a dynamoelectric machine in one form of the invention.
Figure 2:
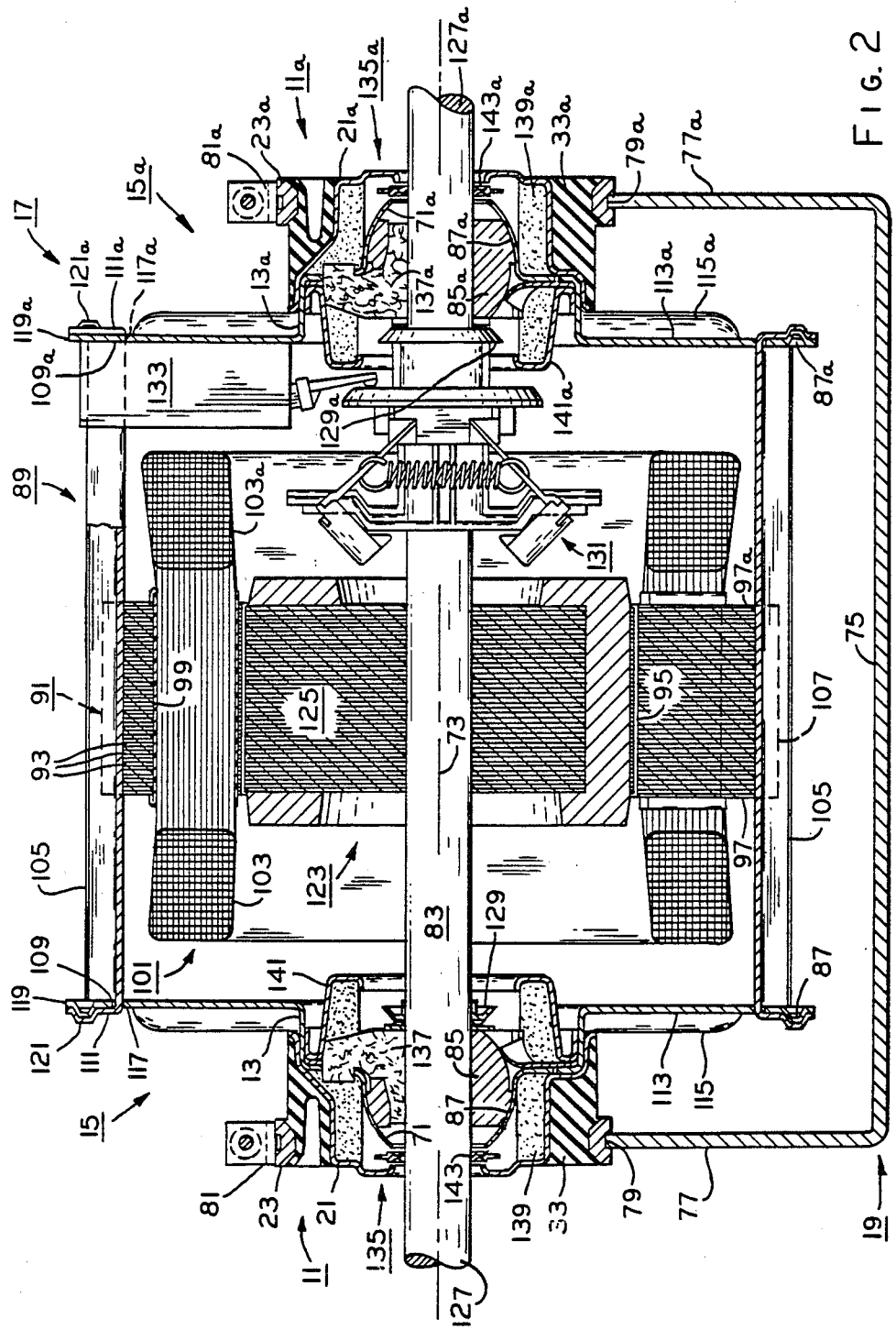
FIG. 2 is a sectional view showing the dynamoelectric machine of FIG. 1 partially in cross section.
Figures 3, 4:
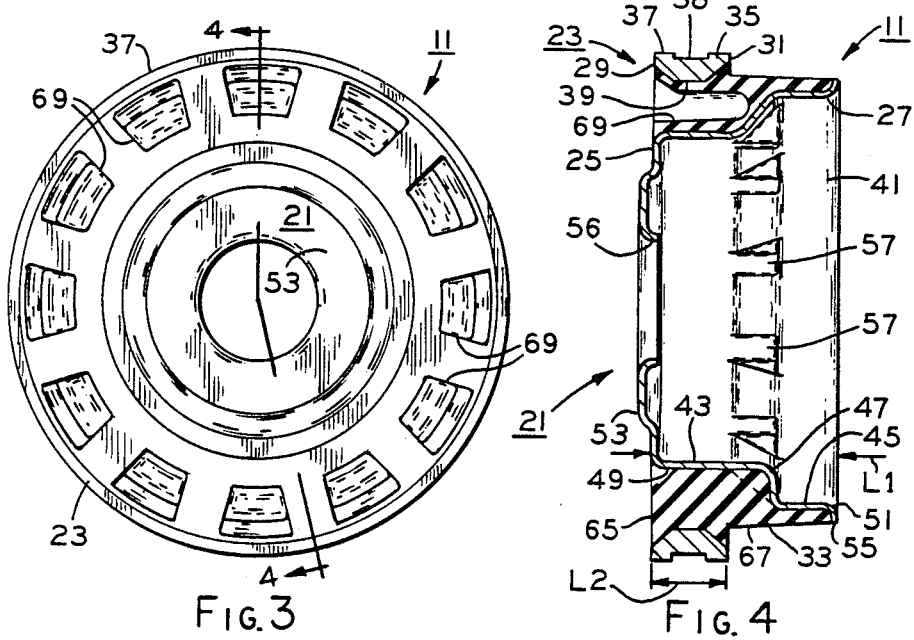
FIG. 3 is an enlarged elevational view of a cushioning device shown disassociated from the dynamoelectric machine of FIG. 1 for the sake of clarity.
FIG. 4 is a sectional view taken along line 4—4 of FIG. 3.

With reference to the drawings in general, there is shown a cushioning device 11 adapted for resilient mounting engagement between a hub or hub portion 13 on an end frame 15 of a dynamoelectric machine 17 and means, such as for instance a cradle 19 or the like, for supporting it (FIGS. 1 and 2). Cushioning device 11 includes a pair of generally annular cylindric mounts 21, 23 arranged generally concentrically with each other, and the mounts have a pair of opposite end portions 25, 27 and 29, 31 defining axial lengths L1, L2 thereof, respectively, with axial length L1 of mount 21 being predeterminately greater than axial length L2 of mount 23 (FIG. 4). A resilient material 33 is interconnected between mounts 21, 23, and the resilient material extends at least in part from at least adjacent opposite end portions 25, 29 of the mounts generally axially beyond opposite end portion 31 of mount 23 toward opposite end portion 27 of mount 21 (FIGS. 4 and 5).

Figure 5:
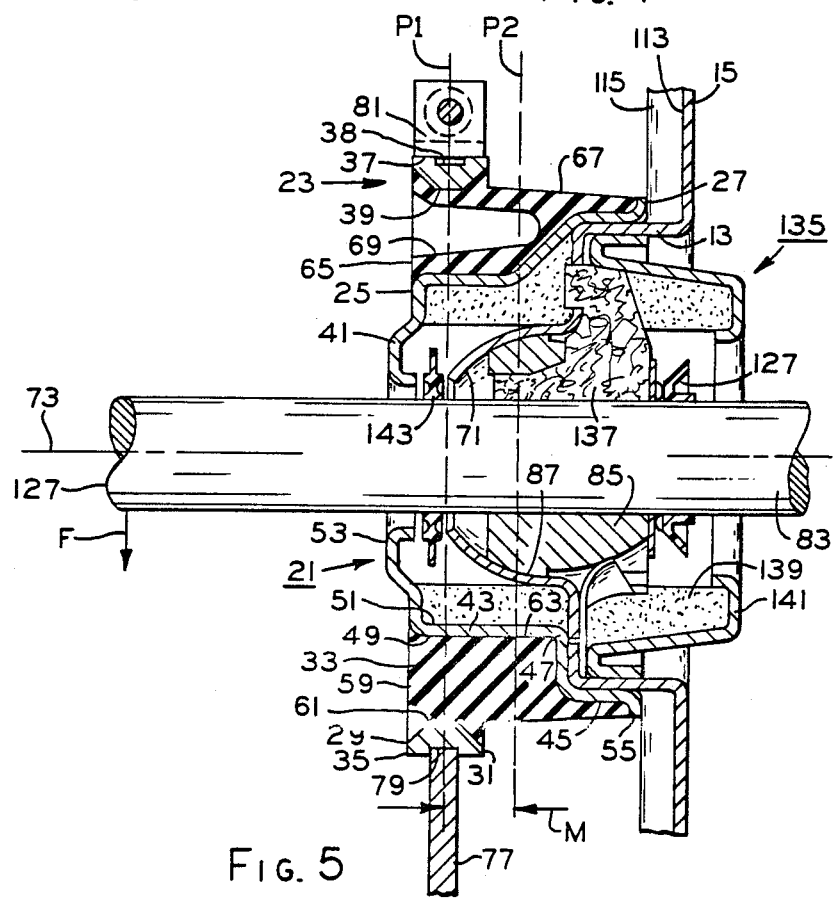
FIG. 5 is an enlarged fragmentary view taken from FIG. 2.

More particularly and with specific reference to FIGS. 3-5, outer mount 23 has a body 35 which may be formed of a generally rigid polymeric material, such as for instance a reinforced nylon or the like for instance; however, it is contemplated that such mount may be formed of various other different types of materials having the desired characteristics therefor within the scope of the invention so as to meet at least some of the objects thereof. Body 35 of mount 23 has an outer circumferential surface 37 with a seating surface 38 therein adapted to receive in the mounting engagement therewith at least a part of supporting means or cradle 19, as discussed in greater detail hereinafter, and an inner circumferential surface 39 of the mount is generally radially spaced from the outer circumferential surface thereof. Opposite end portions 29, 31 define opposite sidewalls on body 35 of mount 23 and are interposed between outer and inner circumferential surfaces 37, 39 thereof, respectively.

Inner mount 21 is arranged at least in part within inner circumferential surface 39 of mount 23 and has a body 41 formed of a suitable material having the desired characteristics therefor, such as for instance a steel or the like; however, it is contemplated that various different materials may be utilized to form such body within the scope of the invention so as to meet at least some of the objects thereof. Body 41 of mount 21 has a pair of generally annular cylindric stepped sleeve sections 43, 45 and a shoulder section 47 is integrally interconnected therebetween. Opposite end portions 25, 27 are provided on stepped sleeve sections 43, 45 and spaced from shoulder section 47, and another outer circumferential surface 49 on the stepped sleeve and shoulder sections between the opposite end portions is arranged in part in opposing relation with inner circumferential surface 39 of mount 23. Another inner circumferential surface 51 is provided on stepped sleeve sections 43, 45 and shoulder section 47 of body 41 for mount 21 extending between opposite end portions 25, 27 thereof, and the inner circumferential surface is spaced generally radially inwardly of outer circumferential surface 49 on the mount body. At least a part of inner circumferential surface 51 on larger stepped sleeve section 45 of body 41 for mount 21 adjacent opposite end portion 27 thereof is adapted to be received in mounting engagement about hub 13 on end frame 15 of dynamoelectric machine 17, as discussed in greater detail hereinafter, and a pair of flanges 53, 55 are integrally formed with the stepped sleeve sections at least adjacent opposite end portions 25, 27 thereof, respectively. It may be noted that flange 53 extends generally radially inwardly beyond smaller stepped sleeve section 43 of inner mount 21 to provide a shaft end receiving opening 56 therein which is formed to define a labyrinth lint shield in combination with the shaft of dynamoelectric machine 17, as discussed in greater detail hereinafter. Flange 55 extends generally radially outwardly beyond outer circumferential surface 49 of body 41 for mount 21, and flange 53 extends generally radially inwardly beyond inner circumferential surface 51 of the mount body. A plurality of splines 57 or the like for instance are integrally formed with stepped sleeve sections 43, 45 of body 41 for mount 21 generally at shoulder 47 therebetween and extend generally radially outwardly generally toward inner circumferential surface 39 on body 35 for mount 23, respectively. It may be noted that splines 57 formed generally at shoulder section 47 of inner mount 21 not only enhance the strength of the inner mount to, facilitate a press-fit thereof about hub 13 of end frame 15 for dynamoelectric machine 17, as discussed in greater detail hereinafter, but also at least oppose rotational displacement between resilient material 33 and the inner mount since the resilient material at least in part encapsulates the splines, as also discussed hereinafter. However, while splines 57 are discussed herein as being formed generally at shoulder section 47 of inner mount 21 for purposes of disclosure, it is, of course, contemplated that such splines may be omitted from the construction of cushioning device 11 or that other splines having various different shapes may be provided at locations other than such shoulder section within the scope of the invention so as to meet at least some of the objects thereof.

Resilient material or resilient cushion 33 has a body 59 formed of at least one thermo-setting elastomeric material interconnected in tension between mounts 21, 23; however, it is contemplated that such resilient material may be formed of any suitable material having the desired characteristics within the scope of the invention so as to meet at least some of the objects thereof. Body 59 of resilient material 33 has an outer circumferential surface 61 interconnected by suitable means, such as for instance bonding or the like, into displacement preventing engagement with at least a part of inner circumferential surface 39 on body 35 for mount 23, and an inner circumferential surface 63 on the resilient material body spaced generally radially inwardly of the outer circumferential surface thereof is interconnected by suitable means, such as for instance bonding or the like, in displacement preventing engagement with at least a part of circumferential surface 49 of body 41 for mount 21. Resilient material 33 extends at least in part about smaller stepped sleeve section 43 of mount 21 so as to at least in part encapsulate splines 57 thereof, and another pair of generally opposite sidewalls 65, 67 on the resilient material are interposed between outer and inner circumferential surfaces 65, 63 thereof, respectively. Opposite side wall 65 of resilient material 33 is disposed at least adjacent opposite end portions 25, 29 of mounts 21, 23, and opposite sidewall 67 of the resilient material is disposed generally between opposite end portions 27, 31 of the mounts, respectively. With resilient material 33 generally encompassing outer circumferential surface 49 of inner mount 21, as illustrated herein for purposes of disclosure, it may be noted that when cushioning device 11 is mounted in cushioning engagement with respect to dynamoelectric machine 17 and cradle 19 therefor, as discussed hereinafter, the bonding interface between the resilient material and the inner mount is of such size to resist separation of the resilient material from the inner mount in response to the rotational torque of the dynamoelectric machine upon the energization thereof. Thus, due to this increased bonding interface resulting in the increased resistance to separation between inner mount 21 and resilient material 33, it is contemplated that splines 57 may be eliminated from the construction of cushioning device 11, as discussed above. Further, with resilient material 33 generally encompassing outer circumferential surface 49 of inner mount 21, it may also be noted that such resilient material protects the inner mount against exposure to the ambient conditions in the working environment in which dynamoelectric machine 17 may be situated thereby to obviate the necessity of an anticorrosive treatment of the inner mount; however, it is contemplated that the extent of the encompassing of the resilient material with the inner mount may vary within the scope of the invention so as to meet at least some of the objects thereof. To complete the description of cushioning device 11, a plurality of spaced apart recesses 69 are provided in body 59 for resilient material 33 at least in part between outer and inner circumferential surfaces 61, 63 thereof, and the recesses intersect with opposite sidewall 65 of the resilient material body being arranged generally between adjacent ones of splines 57 integrally formed with smaller stepped sleeve section 43 of mount 21, respectively.

With reference again to the drawings in general, there is illustrated in one form of the invention a method of assembling dynamoelectric machine 17 which includes end frame 15 with hub 13 extending generally axially therefrom and cushioning device 11 (FIGS. 1, 2, 4 and 5). Cushioning device 11 has mounts 21, 23 arranged generally concentrically with each other with axial length L1 of mount 21 being predeterminately greater than axial length L2 of mount 23, and resilient material 33 is disposed at least in part between the mounts (FIGS. 4 and 5). In practicing this method, a part of mount 21, such as opposite end portion 27 thereof, is associated in mounting engagement about hub 13 of end frame 15 generally along the axial extent of the hub, and thereby cushioning device 11 is extended generally axially from the end frame (FIGS. 2 and 5). When cushioning device 11 is so extended from end frame 15, mount 23 on the cushioning device is disposed or positioned in a preselected position or location axially beyond hub 13 on the end frame (FIG. 5).

More particularly and with specific reference to FIGS. 2–5, at least a partial spherical bearing or bearing seating surface 71 is also provided on end frame 15 and predeterminately arranged so as to be spaced generally axially beyond hub 13 on the end frame. Thus, when cushioning device 11 is axially mounted to end frame 15 thereby to dispose mount 23 of the cushioning device in its preselected or assembly position, as previously mentioned, it may be noted that an imaginary plane P1, as illustrated in dotted line in FIG. 5, extends through the centerline of seating surface 38 on the mount and is at least generally perpendicular to a centerline axis 73 of dynamoelectric machine 17. Of course, the centerline axis of partial spherical bearing seating surface 71 on end frame 15 at least generally coincides with dynamoelectric machine centerline axis 73 as does that of cushioning device 11 when it is mounted to the end frame of dynamoelectric machine 17 in the manner discussed hereinabove. Further, it may also be noted that another imaginary plane P2, as designated in dotted line in FIG. 5, extends at least generally perpendicular to centerline axis 73 of dynamoelectric machine 17 and intersects with partial spherical bearing seating surface 71 at least generally at the axial midsection thereof, and imaginary plane P2 is also at least generally parallel to the aforementioned imaginary plane P1. In order to at least limit the transmission of swivel torque through cushioning device 11 between dynamoelectric machine 17 and cradle 19 therefor, it may be still further noted that imaginary planes P1, P2 are arranged at least closely adjacent each other thereby to define a moment arm M acting generally about end frame 15. Swivel torque may be defined as the coupling effect of forces acting on dynamoelectric machine 17, as a result of the application of a side loading force F onto the shaft of the dynamoelectric machine, as best seen in FIG. 5 and as discussed in greater detail hereinafter. Albeit not shown herein for the sake of brevity of disclosures, it is contemplated that cushioning device 11 and end frame 15 may be associated so as to ideally coincide imaginary planes P1, P2 with each other which would, of course, obviate the aforementioned moment arm M and, of course, the swivel torque.

Cradle 19 for dynamoelectric machine 17 includes a base 75 which has a pair of spaced apart opposite mounting sections 77, 77a integrally formed therewith and extending generally vertically therefrom, as best seen in FIGS. 1 and 2, and a pair of recesses 79, 79a are provided in the mounting section, respectively. While cradle 19 is illustrated herein for purposes of disclosure, it is contemplated that various other dynamoelectric machine supporting means of various different constructions may be employed within the scope of the invention so as to meet at least some of the objects thereof. Upon the location of mount 23 in the preselected position thereof when cushioning device 11 is axially mounted to hub 13 of end frame 15, as previously discussed, at least a part of seating surface 38 on the mount is received within recess 79 in cradle mounting section 77 so as to be disposed or arranged at least in part in seating or abutting engagement therewith as best seen in FIG. 5. It may be noted that the axial length of cradle mounting section 77 generally at recess 79 therein is aligned or spaced generally axially about the centerline of seating surface 38 on cushioning device 11 so that the cradle mounting section extends at least in part in the aforementioned imaginary plane P1. To complete the description of the method of assembly of dynamoelectric machine 17, a releasable strap 81 of a type well known to the art is interconnected with cradle mounting section 77 and extended at least in part about outer circumferential surface 37 on body 35 of mount 23 in abutment therewith so as to retain seating surface 38 of the mount against displacement from its seating or mounting engagement with the mounting section in recess 79 thereof as best seen in FIGS. 1 and 5. While the foregoing discussion has been related to cushioning device 11, end frame 15 and cradle mounting section 77 of dynamoelectric machine 17 for the purpose of clarity and brevity of disclosure, it may be noted that an opposite cushioning device 11a may be associated with an opposite end frame 15a of the dynamoelectric machine and opposite cradle mounting section 77a of cradle 19 either before, after or simultaneously with the above discussed component association in the method of assembling the dynamoelectric machine within the scope of the invention so as to meet at least some of the objects thereof. As shown in FIGS. 1 and 2 for the purpose of drawing simplicity and convenience of disclosure, the letter "a" indicates corresponding opposite component parts of cushioning device 11a, end frame 15a and other components of dynamoelectric machine 11, as discussed hereinafter.

Referring again in general to the drawings, dynamoelectric machine 17 has end frame 15 which includes hub 17 extending generally axially therefrom and partial spherical bearing seating surface 71 disposed generally axially beyond the hub (FIGS. 2 and 5). A rotatable shaft 83 is arranged generally coaxially with partial spherical bearing seating surface 71, and a bearing or bearing means 85 is provided for journaling the shaft (FIGS. 2 and 5). Bearing 85 includes another at least partial spherical bearing or seating surface 87 associated at least in part in bearing engagement with partial spherical bearing surface 71 on end frame 15, and the midsection of the bearing engagement between bearing surfaces 71, 87 defines imaginary plane P2 which is generally perpendicular to shaft 83 (FIG. 5). Supporting means or cradle 19 for dynamoelectric machine 17 includes mounting section 77, and cushioning device 11 is provided for resiliently mounting the dynamoelectric machine with the cradle therefor (FIGS. 1, 2 and 5). Cushioning device 11 includes mounts 21, 23 concentrically arranged with each other, and resilient material 33 is interposed at least in part between the mounts (FIGS. 4 and 5). Mount 21 has its opposite end 27 disposed in mounting relation or arrangement about hub 13 at least in part along the axial extent thereof, and abutment means or seating surface 38 is provided on mount 23 for receiving in seating engagement mounting section 77 of cradle 19 (FIGS. 2 and 5). The centerline of the seating engagement between seating surface 38 on mount 23 and mounting section 77 on cradle 19 defines imaginary plane P1 generally perpendicular to shaft 83 and parallel to imaginary plane P2 with these imaginary planes being predeterminately arranged at least closely adjacent each other (FIG. 5).

More particularly and with specific reference to FIGS. 1-5, dynamoelectric machine 17 includes a stationary assembly 89 having a stator core 91 which may be formed of a plurality of laminations 93 lanced from a generally thin ferromagnetic material and arranged generally in face-to-face relation in a stack thereof, and a bore 95 extends generally axially through such lamination stack intersecting with a pair of opposite end faces 97, 97a thereof. Although stator 91 is illustrated herein for purposes of disclosure, it is contemplated that various other cores having different configurations and formed in various different manners may be utilized within the scope of the invention so as to meet at least some of the objects thereof. A plurality of generally radially disposed winding means accommodating slots 99 are also provided in stator 91 intersecting both bore 95 and opposite end faces 97, 97a thereof. Winding means 101, such as a plurality of conductor turns or coils thereof arranged in a desired winding configuration, is disposed in slots 99, and a pair of opposite generally annular groupings of end turns 103, 103a of the winding means are disposed about bore 95 of stator 91 adjacent opposite end faces 97, 97a thereof respectively.

A plurality of generally elongate beams 105 are secured or mounted by suitable means to stator 91 at least generally adjacent a circumferential portion or surface 107 thereof interposed between opposite end faces 97, 97a of the stator core, and the beams extend in generally opposite directions from the opposite end faces of the stator core. If a more detailed discussion of the beam and stator core mounting arrangement is desired, reference may be had to U.S. Pat. No. 3,867,654 issued Feb. 18, 1975 to Charles W. Otto which is incorporated herein by reference. A pair of opposite abutments 109, 109a with a pair of opposite tabs 111, 111a extending generally axially therebeyond are integrally formed on beams 105, respectively; however, while the beams are shown herein for purposes of disclosure, it is contemplated that various other beams having different configurations and secured in different manners to the stator core may be utilized within the scope of the invention so as to meet at least some of the objects thereof.

Opposite end frames 15, 15a may be lanced or otherwise formed from a metallic sheet material, such as for instance a sheet steel or the like, and it is contemplated that such formation of the end frame may be accomplished by the use of progressive dies or the like for instance (not shown). End frames 15, 15a include a pair of generally planar portions or sections 113, 113a formed so as to extend about generally central portions or sections of the end frames on which are integrally provided hubs 13, 13a and partial spherical bearing surfaces 71, 71a extending generally coaxially about shaft 83, respectively, as previously mentioned. Although end frames 15, 15a are disclosed as having generally planar portions 113, 113a, the end frames may be provided with a pair of sets of means, such as for instance ribs 115, 115a or the like, for strengthening the generally planar portions and may have passages for the passage of ambient air therethrough, respectively. A pair of sets of apertures or generally elongate slots 117, 117a are arranged in preselected locations generally radially outwardly of the central portion of end frames 15, 15a so as to extend therethrough adjacent a pair of circumferential edges 119, 119a of the end frames, respectively. End frames 15, 15a are seated against at least some of opposite abutments 109, 109a on beams 105, and tabs 111, 111a extend at least in part through apertures 117, 117a in the end frames, respectively. As shown herein, tabs 111, 111a are deformed into overlaying relation with end frames 15, 15a, and a pair of sets of clinched joints 121, 121a are deformed from both the tabs and the end frames thereby to retain the end frames against displacement from beams 105. If a more detailed discussion is desired with respect to the attachment of end frames 15, 15a to beams 105, reference may be had to the commonly assigned application Ser. No. 598,902 filed Apr. 10, 1984 (now U.S. Pat. No. 4,521,953 issued June 11, 1985) which is incorporated herein by reference. While clinched joints 121, 121a are illustrated herein to effect the attachment of end frames 15, 15a and beams 105 for purposes of disclosure, it is contemplated that such attachment may be effected by various other means and methods within the scope of the invention so as to meet at least some of the objects thereof, and to this end reference may be had to the commonly assigned applications Ser. No. 402,282 (now U.S. Pat. No. 4,480,378 issued Nov. 6, 1984) and Ser. No. 402,320 (now U.S. Pat. No. 4,473,764 issued Sept. 25, 1984) concurrently filed on July 27, 1982 which are respectively incorporated herein by reference.

A rotatable assembly 123 includes a rotor 125 mounted about shaft 83 between a pair of opposite shaft ends or extensions 127, 127a for conjoint rotation therewith, and a pair of thrust devices 129, 129a are secured to the opposite shaft extensions for thrust taking or end play engagement with bearings 85, 85a of end frames 15, 15a, respectively. Rotor 125 is disposed at least in part within bore 95 of stator 91 with a generally uniform air or flux gap therebetween and is arranged in magnetic coupling relation with winding means 101 of the stator upon the excitation thereof when dynamoelectric machine 17 is energized across a power source (not shown). Although rotor 125 is illustrated herein for purposes of disclosure, it is contemplated that various other types of rotors, such as for instance one carrying a set of permanent magnet material elements for selective magnetic coupling engagement with winding means 101 upon the excitation thereof, may be utilized within the scope of the invention so as to meet at least some of the objects thereof. A centrifugal mechanism 131 is carried on opposite shaft extension 127a for conjoint rotation therewith, and if a more detailed discussion of the construction and operation of the centrifugal mechanism is desired, reference may be had to U.S. Pat. No. 4,208,559 issued June 17, 1980 to Steven J. Gray which is incorporated herein by reference. Of course, centrifugal mechanism 131 is arranged to operate a switch assembly 133 carried on end frame 15a for controlling the energization of winding means 101 on stator 91 during the energization of dynamoelectric machine 17, as well known in the art, and if a more detailed discussion of the construction and operation of the switch assembly and the association thereof with the winding means and the end frame, reference may be had to the commonly assigned James L. King patent application Ser. No. 496,552 filed May 20, 1983, (now abandoned) and the commonly assigned James P. Frank and James L. King patent application Ser. No. 496,524 filed May 20, 1983 which are respectively incorporated herein by reference. Depending upon the contemplated use for dynamoelectric machine 17 and upon the winding configuration of winding means 101 thereof, it is, of course, contemplated that centrifugal mechanism 131 and switch assembly 133 may be omitted from dynamoelectric machine 17 within the scope of the invention so as to meet at least some of the objects thereof. Opposite shaft extensions 127, 127a are received in journaling engagement with bearings 85, 85a, and partial spherical bearing surfaces 87, 87a of the bearings are arranged in bearing engagement with partial spherical bearing surfaces 71, 71a on end frames 15, 15a, respectively.

A pair of lubrication systems 135, 135a associated with end frames 15, 15a include a pair of feeder wicks 137, 137a of a suitable material associated with bearings 85, 85a and arranged in lubricating engagement with opposite shaft extensions 127, 127a and a pair of lubricant storage wicking means 139, 139a arranged to contain and flow flow lubricant to the feeder wicks, respectively. Storage wicking means or material 139, 139a may be GELUBE available from the General Electric Company Fort Wayne, Ind. While feeder wicks 137, 137a and storage wicking material 139, 139a are illustrated herein for purposes of disclosure, it is contemplated that various other feeder and storage wicks having different shapes, formed of different materials and associated in different manners with each other and with the bearings may be utilized within the scope of the invention so as to meet at least some of the claims thereof. Retaining means or oil well covers 141, 141a are secured to opposite end frames 15, 15a within hubs 13, 13a and cushioning devices 11, 11a are secured about the hubs on the end frames, as previously mentioned, wherein the cushioning devices and the oil well covers retain storage wicks 139, 139a in place with respect to feeder wicks 137, 137a and bearings 85, 85a, respectively. Further, as previously mentioned, openings 56, 56a in flanges 53, 53a of cushioning devices 11, 11a extend about opposite shaft extensions 127, 127a to establish a barrier or shield preventing the entry of foreign particles, such as lint or the like for instance, between the openings and the opposite shaft extensions in the event dynamoelectric machine 17 is energized in an environment of such foreign particles, and a set of means, such as oil slingers 143, 143a or the like for instance, are carried on opposite shaft and extensions 127, 127a, of shaft 83 for interrupting lubricant flow from bearings 85, 85a along the opposite shaft end extensions and throwing or slinging such interrupted lubricant back into lubricant storage wicks 139, 139a. To complete the description of dynamoelectric machine 17, it may also be noted that the association of cushioning devices 11, 11a with the dynamoelectric machine not only in part defines the oil well cavities thereof containing bearings 85, 85a and lubrication systems 135, 135a therefor but also permits the capacity of such oil well cavities to be increased by design thereby to positively provide enough storage wicking material 139, 139a to ensure adequate lubrication for the dynamoelectric machine.

When dynamoelectric machine 17 is associated with an apparatus adapted to be driven thereby, the aforementioned side load force F may be exerted on opposite shaft extension 127 of shaft 83, as best seen in FIG. 5, and such side load force F may be in the form of a belt and pulley combination or the like for instance (not shown) associated with opposite shaft extension 127, as well known to the art. While another side load force may similarly be applied onto opposite shaft extension 127a, only the application of side load force F onto opposite shaft extension 127 and its resultant affect is discussed herein for the sake of brevity and drawing simplicity. It may be noted that the construction of the present invention permits the application of side load force F on opposite shaft extension 127 to be closely axially located adjacent bearing 85 which is believed to advantageously limit flexing of shaft 83 generally about or with respect to the bearing in which the shaft is journaled. Furthermore, since imaginary planes P1, P2 are predeterminately located in generally parallel relation at least closely adjacent each other, the moment arm or bending moment M between such imaginary planes is predeterminately small, as discussed in detail hereinbefore. Additionally, load force F acting through bearing 85 creates a bending moment generally about the plane of end frame 15, and such bending moment is transmitted through cushioning device 11 so as to be opposed by the seating engagement of the cushioning device with cradle 19, as previously discussed. By predeterminately limiting the magnitude of the aforementioned bending moment, end frame 15 may be formed from a material having less cross-sectional thickness, i.e., of lesser strength. Since the bending moment M is predeterminately maintained at a small or reduced value, there is less self-aligning action or cocking of bearing 85 on end frame bearing surface 71 therefor at least during start up energization of dynamoelectric machine 17 which at least alleviates the establishment of a high friction condition between shaft 83 and bearing 85 in the journaling engagement thereof. Due to the above discussed predetermined limitation of the self-aligning action of bearing 85 with end frame bearing surface 71 therefor, the aforementioned swivel torque or twisting moment of cushioning device 11 about end frame 15 tending to pry or displace larger stepped sleeve section 45 of the cushioning device from its mounting or press-fit engagement about hub 13 on the end frame is also correspondingly reduced. As a result of this reduction in the swivel torque, the axial press-on engagement between larger stepped sleeve section 45 of cushioning device 11 with hub 13 of end frame 15 is believed to be also reduced thereby to result in an end frame design having a minimum hub length which, of course, effects a shortening of the overall length of the dynamoelectric machine while maintaining adequate lubrication capacity. As a result of the aforementioned reduced push-on force, the strength requirements of end frame 15 is, of course, correspondingly reduced thereby to permit the utilization of a material therefor of lesser strength or the provision of larger air flow passages through the end frame to enhance cooling of dynamoelectric machine 17.

From the foregoing, it is now apparent that a novel method of assembling a dynamoelectric machine has been presented meeting the objects and advantageous features set out hereinbefore, as well as others, and that modifications as to the precise configurations, details and connections of the component parts utilized in such assembling method, as well as the steps and order thereof of such assembling method, may be made by those having ordinary skill in the art without departing from either the spirit of the invention or the scope thereof as defined by the claims which follow.

What we claim as new and desire to secure by Letters Patent of the United States is:

1. A method of assembling a dynamoelectric machine, the dynamoelectric machine having at least one end frame with a hub portion extending generally axially therefrom, and a cushioning device, including a pair of generally annular cylindric mounts arranged generally concentrically with each other with one of the mounts having an axial length predeterminately greater than the other of the mounts, and a resilient material disposed at least in part between the mounts, the method comprising the steps of:

associating a part of the one mount of the cushioning device in mounting engagement about the hub portion of the at least one end frame generally along the axial extent of the hub portion and extending thereby the cushioning device generally axially from the at least one end frame; and positioning the other mount generally in a preselected location axially beyond the hub portion of the at least one end frame in response to the associating and extending step.

2. The method as set forth in claim 1 wherein the dynamoelectric machine also has means for supporting at least the cushioning device with the supporting means having at least one mounting section, and wherein the method further comprises the additional step of arranging the other mount in seating engagement with at least a part of the at least one mounting section on the supporting means.

3. The method as set forth in claim 1 wherein the dynamoelectric machine also has at least a partial spherical bearing surface on the at least one end frame and disposed generally axially beyond the hub portion thereof, the cushioning device further including a generally circumferential and axially extending seating surface about at least a part of the other mount, and wherein the positioning step includes locating a centerline of the seating surface on the other mount in the preselected location thereof at least closely adjacent an imaginary plane generally perpendicular to the centerline axis of the at least partial spherical bearing surface and intersecting the at least partial spherical bearing surface at least generally adjacent the midsection thereof.

4. The method set forth in claim 3 wherein the dynamoelectric machine further has means for supporting at least the cushioning device with the supporting means having at least one mounting section and wherein the locating step includes arranging at least a part of the at least one mounting section in seating engagement with at least a part of the seating surface on the other mount generally at the centerline thereof.

5. A method of assembling a dynamoelectric machine, the dynamoelectric machine including at least one end frame with a hub portion extending generally axially therefrom, a cushion device, and the cushioning device including a pair of generally annular cylindric mounts one of the mounts being generally concentrically disposed about the other of the mounts at least adjacent a free end portion thereof and being predeterminately axially spaced from another end portion of the other mount opposite the free end portion thereof, and a resilient material disposed at least in part between the concentrically arranged mounts, the method comprising the steps of:

pressing the another end of the other mount into mounting engagement about the hub on the at least one end frame and disposing the another end of the other mount at least adjacent a part of the at least one end frame extending generally radially about the juncture of the at least one end frame part with the hub portion; and extending the cushioning device generally axially from the at least one end frame and arranging the one mount in a preselected position axially spaced beyond the hub portion of the at least one end frame in response to the pressing and disposing step.

6. The method as set forth in claim 5 wherein the dynamoelectric machine further includes at least a partial spherical bearing surface on the at least one end frame, and the cushioning device further includes a generally circumferentially and axially extending seating surface about at least a part of the one mount, and wherein the extending and arranging step includes locating a centerline of the seating surface on the one mount in its preselected position at least closely adjacent an imaginary plane generally perpendicular to a centerline axis of the at least partial spherical bearing surface and intersecting with the at least partial spherical bearing surface.

7. The method as set forth in claim 6 wherein the dynamoelectric machine further includes means for supporting at least the cushioning device with the supporting means having at least one mounting section, and wherein the locating step includes associating at least a part of the at least one mounting section in seating engagement with at least a part of seating surface on the one mount at least adjacent the centerline thereof.

8. The method as set forth in claim 5 wherein the dynamoelectric machine further includes means for supporting at least the cushioning device with the supporting means having at least one mounting section, and wherein the method further comprises the additional step of associating the other mount in engagement with at least a part of the at least one mounting section.

9. A method of assembling a dynamoelectric machine, the dynamoelectric machine including a stationary assembly having a pair of opposite end frames with a pair of integral hub portions extending generally axially therefrom and with a pair of at least partial spherical bearing surfaces on the opposite end frames spaced generally axially beyond the hub portions thereof, respectively, a means for supporting at least the stationary assembly with the supporting means having a pair of axially spaced apart mounting sections, and a pair of devices for cushioning in engagement between the supporting means and the stationary assembly and with each cushioning device including a pair of generally annular cylindric mounts each having a pair of opposite end portions defining the axial length thereof with the axial length of one of the mounts being predeterminately greater than that of the other of the mounts and with the other mount being arranged generally concentrically about the one mount at least adjacent one of the opposite end portions thereof, a generally axial seating surface on the other mount extending at least in part generally circumferentially thereabout, and a resilient material interconnected between the mounts in the generally concentric arrangement thereof, respectively, the method comprising the steps of:

receiving the hub portions of the opposite end frames in engagement within the other opposite end portions of the one mounts and extending thereby the cushioning devices generally axially from the opposite end frames, respectively;

disposing the others generally in preselected positions spaced axially beyond the hub portions of the opposite end frames and locating a pair of imaginary planes extending along the centerlines of the seating surfaces on the other mounts and perpendicular to the axial lengths thereof at least closely adjacent another pair of imaginary planes extending perpendicular to the centerline axes of the at least partial spherical bearing surfaces on the opposite end frames and intersecting the at least partial spherical bearing surfaces at least generally adjacent the midsections thereof in response to the receiving and extending step and with the first named and another imaginary planes being generally parallel to each other, respectively; and seating the seating surface on the other mounts in engagement with at least a part of the mounting sections of the supporting means and aligning the at least parts of the mounting sections generally axially about the centerlines of the seating surfaces with the mounting sections extending at least in part in the first named imaginary planes, respectively.

* * * * *